United States Patent
Edwards et al.

(10) Patent No.: US 6,196,513 B1
(45) Date of Patent: Mar. 6, 2001

(54) COLLAPSIBLE ADJUSTABLE FISHING ROD SUPPORT ASSEMBLY

(76) Inventors: John Scott Edwards; Cindy L. Jensen, both of P.O. Box 1227, 57N 32E, Grantsville, UT (US) 84029

(*) Notice: Subject to any disclaimer, the term of this patent is extended or adjusted under 35 U.S.C. 154(b) by 0 days.

(21) Appl. No.: 09/333,140

(22) Filed: Jun. 14, 1999

(51) Int. Cl.⁷ .................................................. F16M 13/00
(52) U.S. Cl. .............................. 248/528; 43/23; 248/520; 248/537; 248/682
(58) Field of Search .................................... 248/528, 529, 248/520, 538, 682, 685; 43/23, 21.2

(56) References Cited

U.S. PATENT DOCUMENTS

| | | |
|---|---|---|
| D. 405,500 | 2/1999 | Burby et al. . |
| 3,803,742 * | 4/1974 | Foster ........................ 43/23 |
| 4,133,131 | 1/1979 | Davy . |
| 4,159,816 * | 7/1979 | Miyamae ................... 248/528 X |
| 4,523,403 | 6/1985 | Ivy et al. . |
| 4,594,805 | 6/1986 | McClelland . |
| 4,611,427 | 9/1986 | Coutcher . |
| 4,676,019 * | 6/1987 | Engles ........................ 43/21.2 |
| 4,763,435 | 8/1988 | Deering . |
| 4,854,069 | 8/1989 | Smith et al. . |
| 5,038,511 | 8/1991 | Gessner . |
| 5,400,996 | 3/1995 | Drish . |

* cited by examiner

Primary Examiner—Ramon O. Ramirez
(74) Attorney, Agent, or Firm—Chase & Yakimo, L.C.

(57) ABSTRACT

A fishing rod holder comprises a base for placement on a ground support surface and having an offset channel extending between first and second ends of the base. A first arm is pivotally mounted to the first end of the base between a first transport position within the channel and a second support position extending upwardly from the channel. A second arm is pivotally mounted to the second end of the base and is pivotal between a first transport position within the channel and a second support position extending upwardly from the channel. A cradle is attached to each of the first and second arms for supporting portions of the fishing rod when the first and second arms are in their second support positions. The offset base in the channel positions the first and second arms and cradles thereon in an over/under relationship within the confines of the base. Nubs within the base releasably engage notches in the cradles to maintain the arms at the transport and support positions.

20 Claims, 12 Drawing Sheets

COLLAPSIBLE ADJUSTABLE FISHING ROD SUPPORT ASSEMBLY

BACKGROUND OF THE INVENTION

This invention relates to a fishing rod support assembly and, more particularly, to a collapsible and extensible assembly for supporting a fishing rod in a plurality of user selected positions.

A fisherman often grows weary of continuously holding a fishing rod when fishing for an extended period of time, particularly when fishing with live bait where repeated casting and reeling is unnecessary. Accordingly, the fisherman often attempts to prop the fishing rod up using any available support means, such as a forked stick or a pile of rocks. These natural supports, however, are typically unstable and unreliable to hold the rod in a desired position for a significant period of time.

Various devices exist for supporting a fishing rod. Although assumably effective in operation, such devices are either complex and expensive in their construction or do not provide adequate adjustability of both the height and angle at which a fishing rod is held. Further, existing devices are not collapsible wholly within a base such that the elements of the device cannot be snagged on tree branches, underbrush, or the like during transport.

Therefore, it is desirable to have a fishing rod support assembly which can be selectively adjusted to hold a fishing rod at a desired height above the ground. It is also desirable to have a fishing rod support assembly which can be adjusted to hold the fishing rod at a desired angle of elevation. Finally, it is desirable to have a fishing rod support assembly which is collapsible within a base such that assembly elements cannot be snagged during transport through underbrush, etc.

SUMMARY OF THE INVENTION

In response thereto we have invented an adjustable fishing rod support assembly utilizing an elongated base having first and second ends with side walls extending therebetween. The base has convex exterior surfaces which diminish the risk of becoming snagged by trees or underbrush. The base includes a channel extending between the base ends. A first arm is pivotally mounted to the first end of the base and is selectively movable between a first transport position within the channel and a second support position vertically extending from the channel. A second arm is pivotally mounted to the second end of the base and is also selectively movable between a first transport position and second support position. In the transport position, the arms are held entirely within the base.

The first and second arms each include a slidable arm therein. A cradle is attached to the free end of each slidable arm for supporting a fishing rod thereon. The slidable arms include resilient flanges which register with apertures in the first and second arms, respectively, for maintaining the slidable arms at selected positions relative to first and second arms.

The assembly further includes flange/notch combinations for releasably holding the first and second arms in transport or extended positions, as desired.

It is therefore a general object of this invention to provide a support assembly for holding a fishing rod above a ground surface.

Another object of this invention is to provide a support assembly, as aforesaid, which is telescopically adjustable for holding a fishing rod a selected height above the ground.

Still another object of this invention is to provide a support assembly, as aforesaid, having extensible arms for selectively adjusting the angle of inclination of a fishing rod thereon relative to the underlying support surface.

A further object of this invention is to provide a support assembly, as aforesaid, in which support members pivotally collapse within a base for transport and storage.

A still further object of this invention is to provide a support assembly, as aforesaid, having a handle for carrying the assembly in a collapsed configuration.

Other objects and advantages of this invention will become apparent from the following description taken in connection with the accompanying drawings, wherein is set forth by way of illustration and example, an embodiment of this invention.

DESCRIPTION OF THE PREFERRED EMBODIMENT

Figure 1:
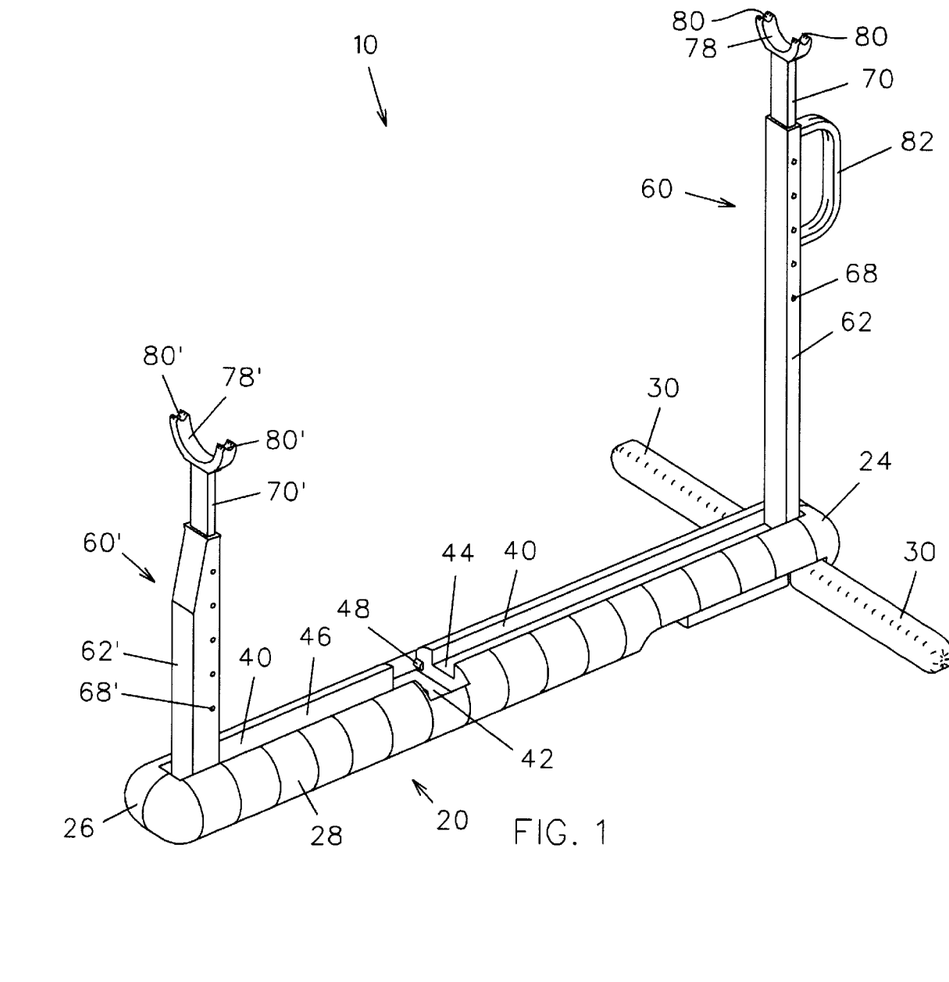
FIG. 1 is a perspective view of the fishing rod support assembly according to the present invention.
Figure 2:
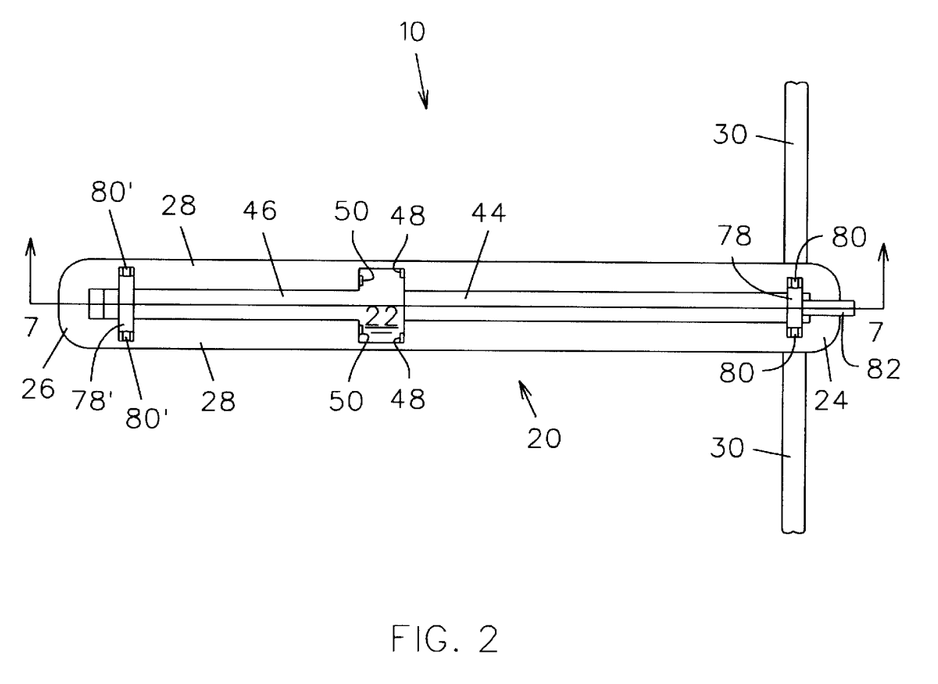
FIG. 2 is top view of the assembly of FIG. 1.

Turning more particularly to the drawings, FIGS. 1 and 2 show the fishing rod support assembly 10 having an elongated base 20 constructed of a molded plastic material or the like. The base 20 is generally rectangular and includes a bottom wall 22, first 24 and second 26 ends extending upwardly therefrom, and upstanding side walls 28 intermediate ends 24, 26. Exterior surfaces of the side walls 28 and ends 24, 26 are convex such that the base 20 is not snagged by trees or underbrush during transport to or from a fishing location.

Figure 3:
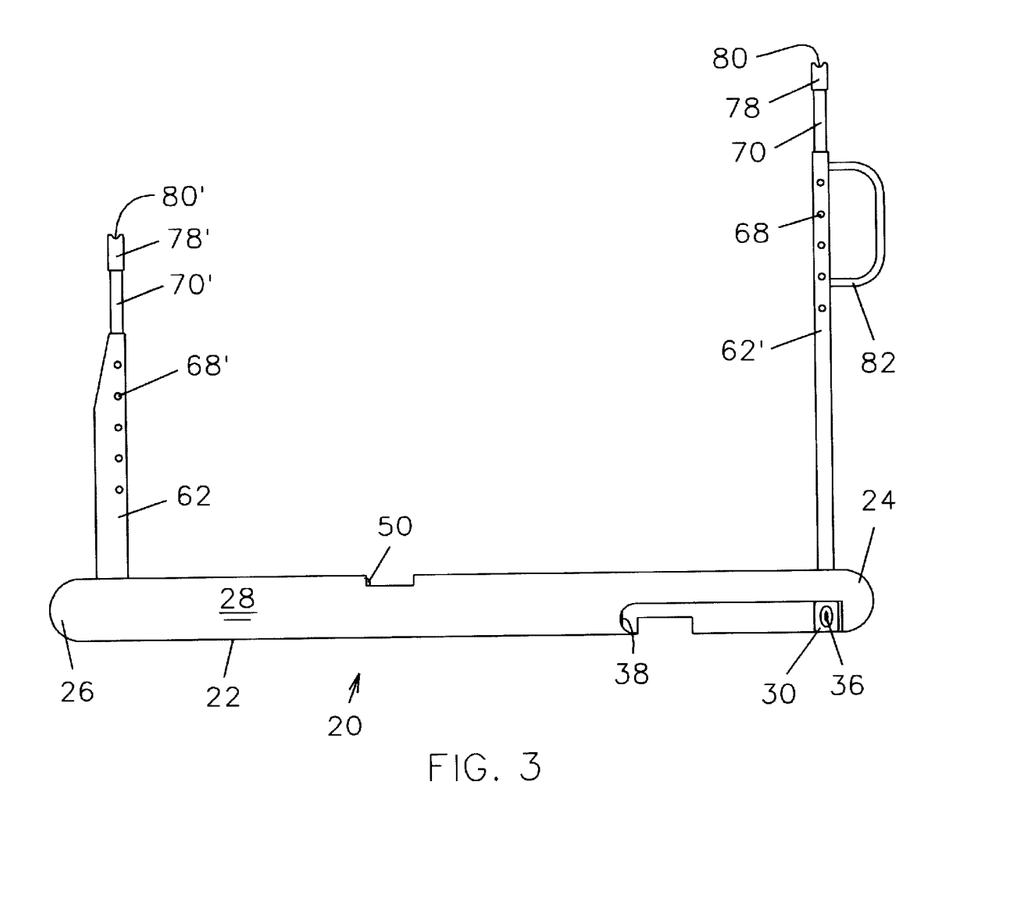
FIG. 3 is a side view of the assembly of FIG. 1.
Figure 4:
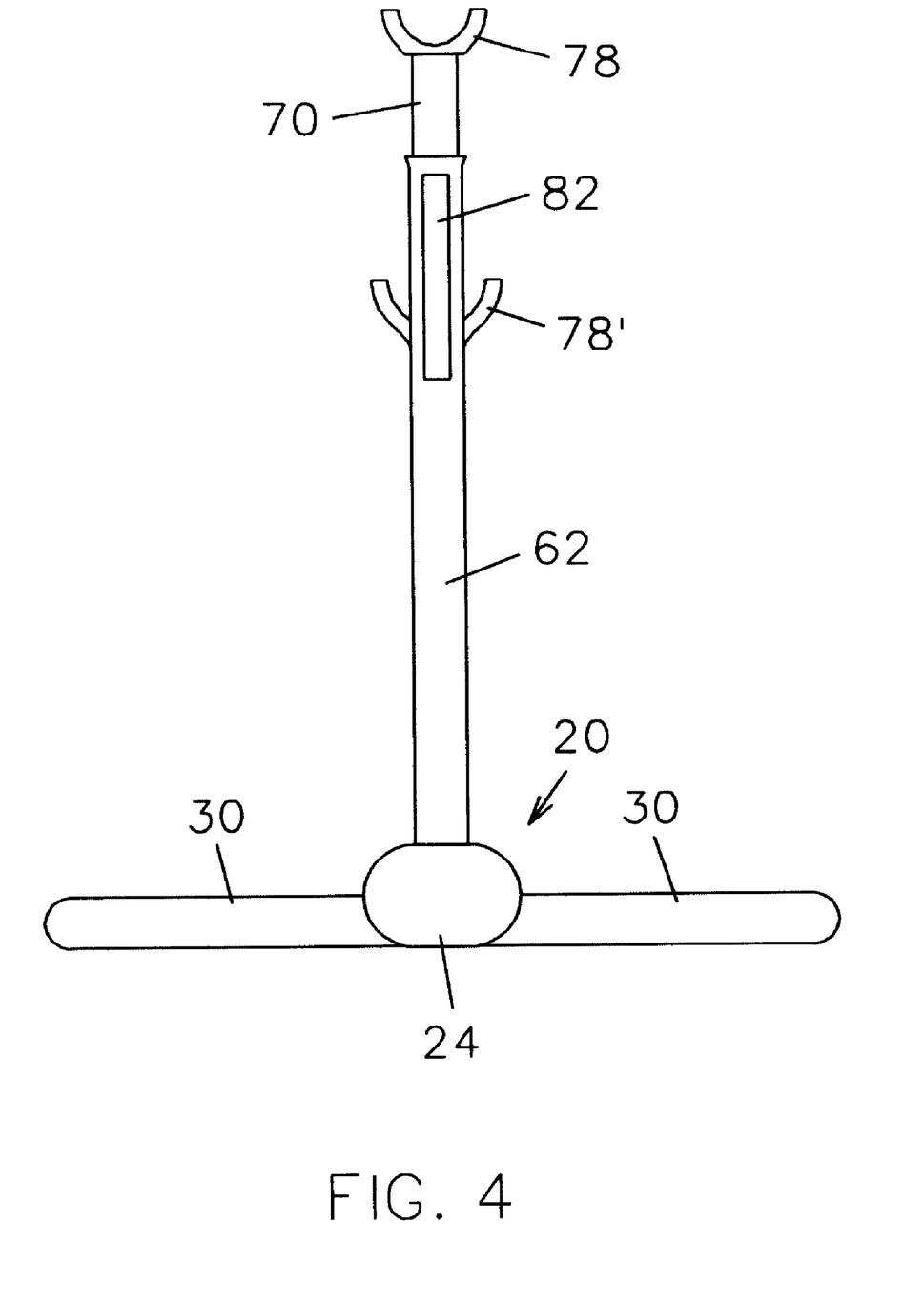
FIG. 4 is an end view of the assembly of FIG. 1.
Figure 5:
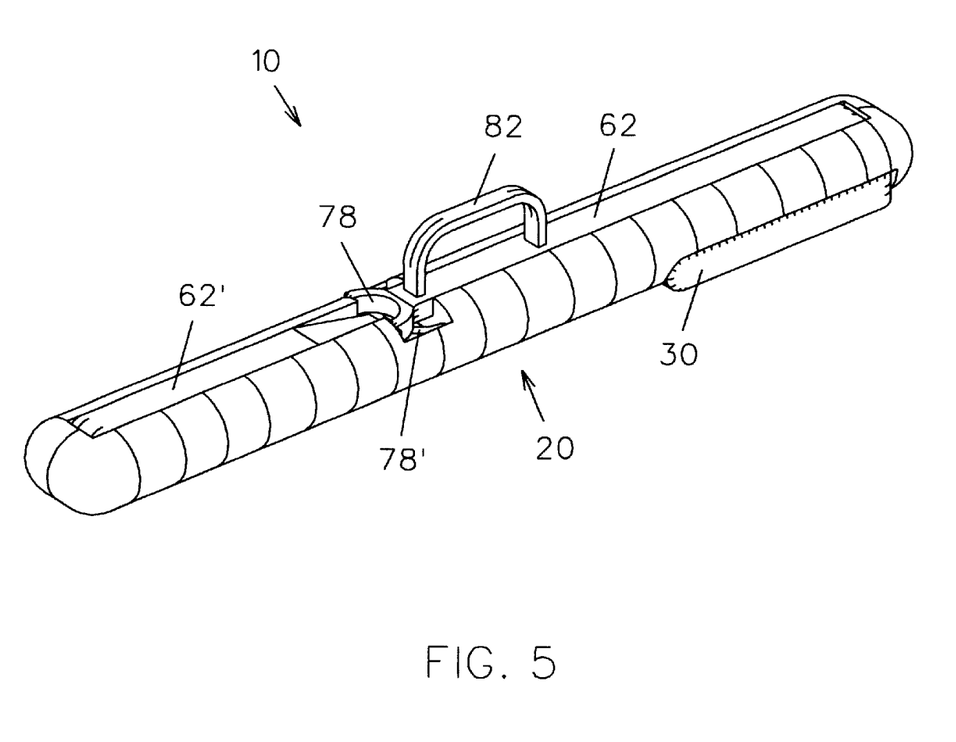
FIG. 5 is a perspective view of the support assembly in a collapsed configuration.

A pair of support legs 30 are pivotally mounted to the first end 24 of the base 20. The legs 30 may be pivoted about a vertically extending axle 32 (FIG. 12) between a first extended position (FIG. 1) and a second transport position (FIG. 5). The mounting end of each leg 30 presents a notch 34 configured to releasably mate with a nub/flange (not shown) on the base for releasably holding the leg 30 in the extended position. The free end of each leg includes a notch 36 configured to mate with a nub/flange 38 extending from the underside of the base 20 for releasably holding the leg in the transport position (FIGS. 3 and 12).

An elongated channel 40 is formed by the side walls 28 of the base 20 and extends longitudinally between first 24 and second 26 ends. A cavity 42 extends between outer surfaces of the base side walls 28 and divides the channel 40 into first 44 and second 46 recessed portions. The second recessed portion 46 has a depth greater than that of the first recessed portion 44. A first lower pair of nubs/flanges 48 and an oppositely disposed second upper pair of nubs/flanges 50 extend from the base 20 within the cavity 42 (FIGS. 1 and 2). This channel configuration allows arm assemblies to be held in a transport position within the base 20, as to be further described below.

Figure 6:
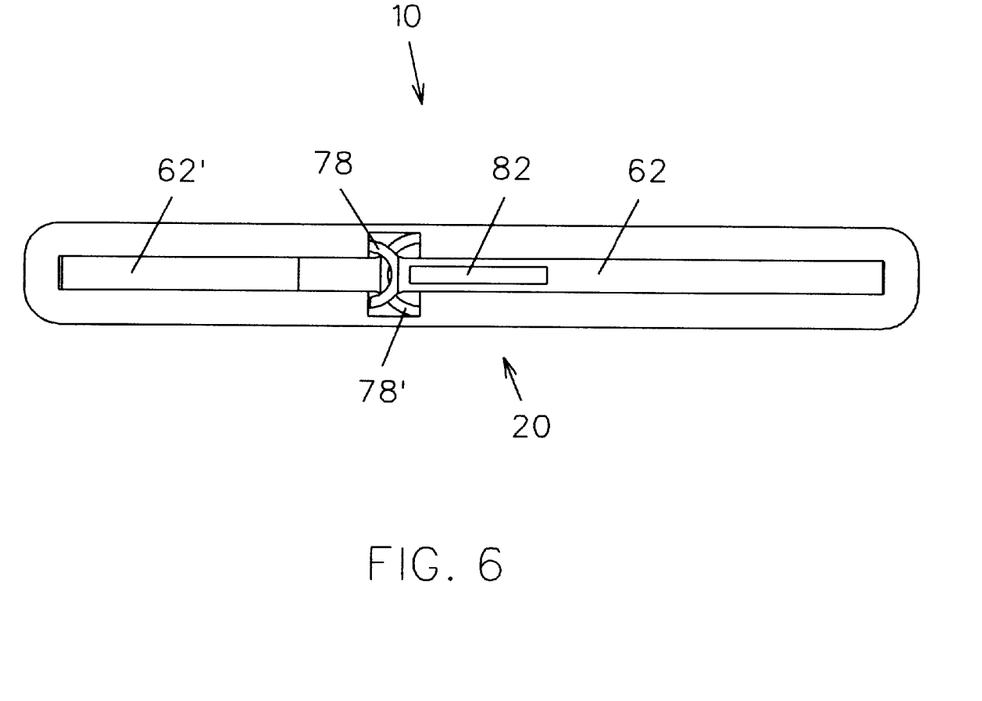
FIG. 6 is a top view of the assembly of FIG. 5.
Figure 7:
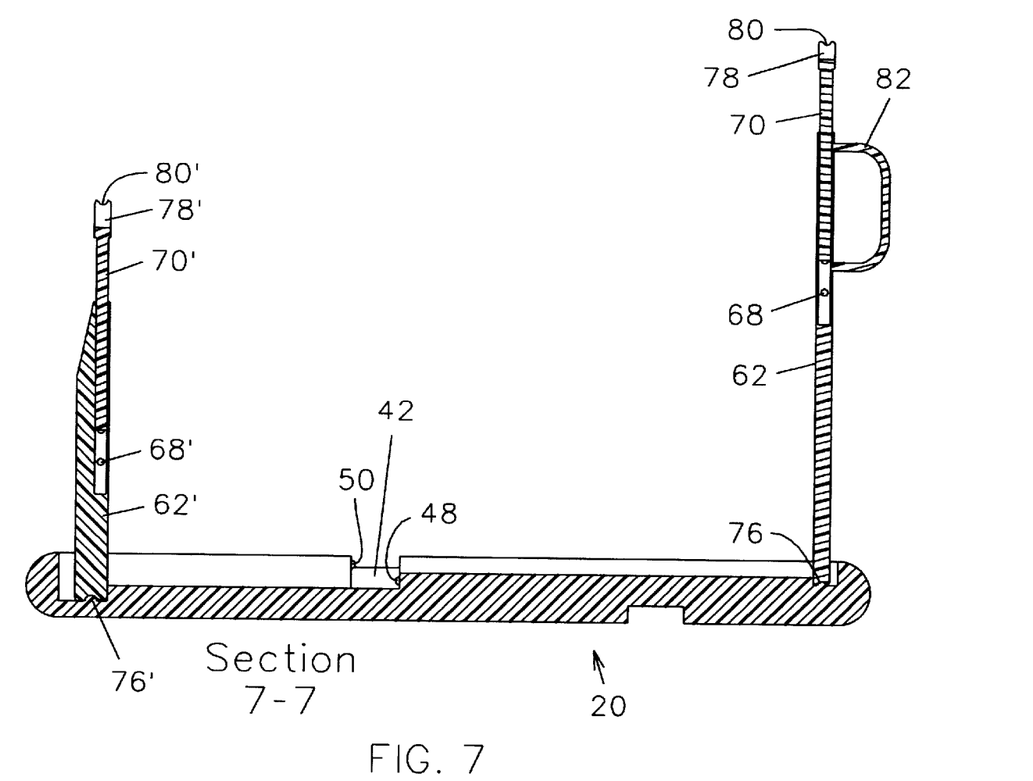
FIG. 7 is a sectional view of the assembly taken along line 7—7 of FIG. 2.
Figure 8A:
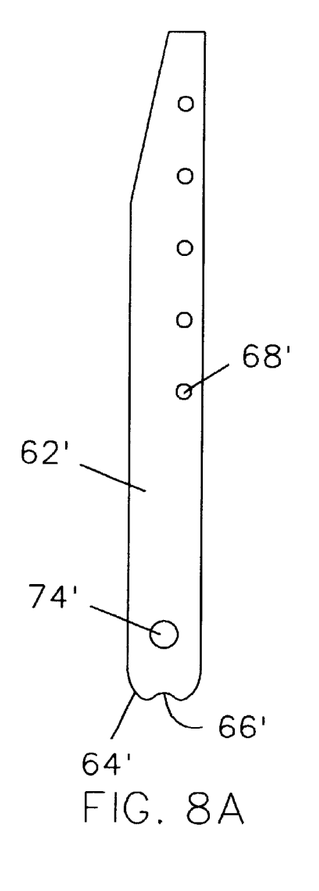
FIG. 8A is a side view of the lower sleeve of the second arm of the assembly of FIG. 1.
Figure 8B:
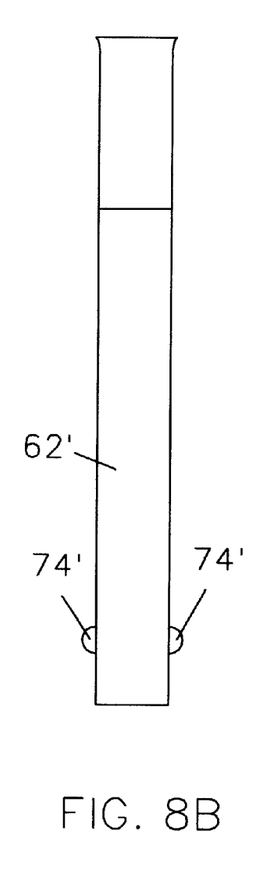
FIG. 8B is an end view of the lower sleeve of the second arm of the assembly of FIG. 1.
Figure 8C:
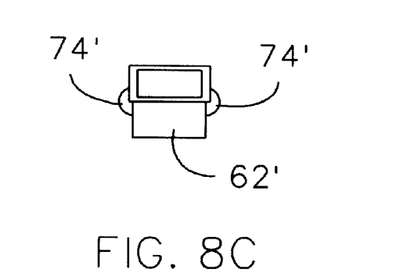
FIG. 8C is a top view of the lower sleeve of FIG. 8A.
Figure 8D:
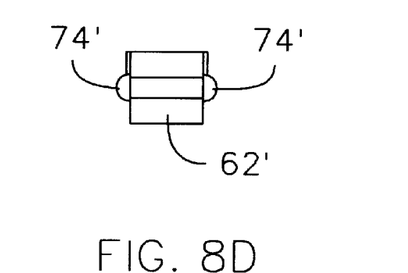
FIG. 8D is bottom view of the lower sleeve of FIG. 8A.
Figure 10A:
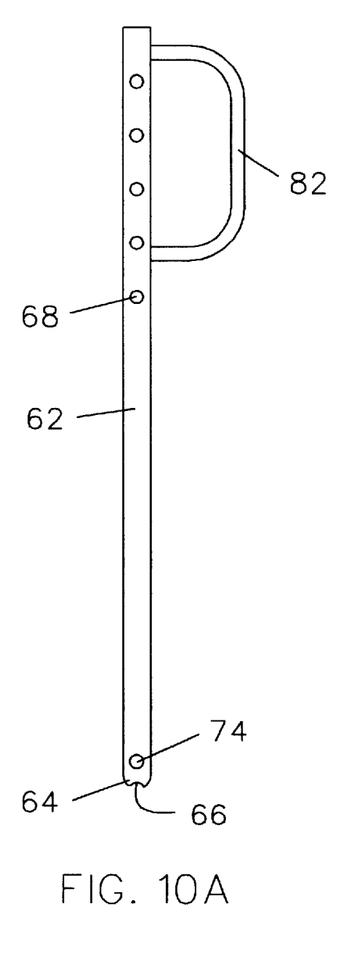
FIG. 10A is a side view of the lower sleeve of the first arm of the assembly of FIG. 1.
Figure 10B:
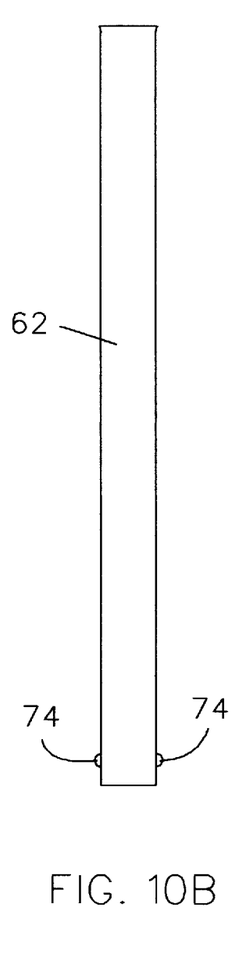
FIG. 10B is an end view of the lower sleeve of the first arm of the assembly of FIG. 1.
Figure 10C:
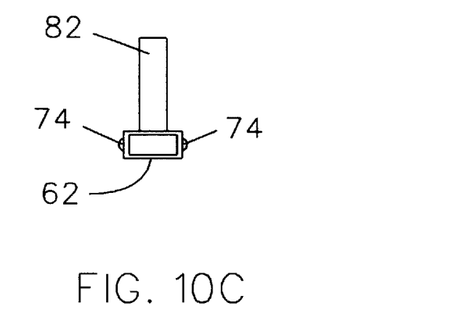
FIG. 10C is a top view of the lower sleeve of FIG. 10A.
Figure 10D:
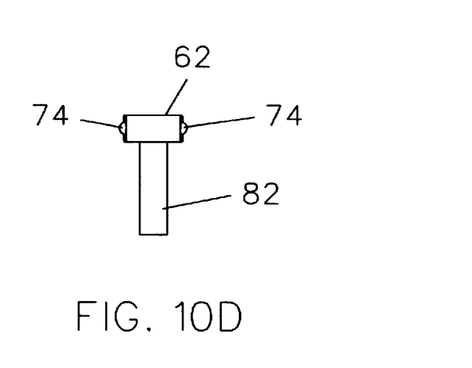
FIG. 10D is a bottom view of the lower sleeve of FIG. 10A.
Figure 11A:
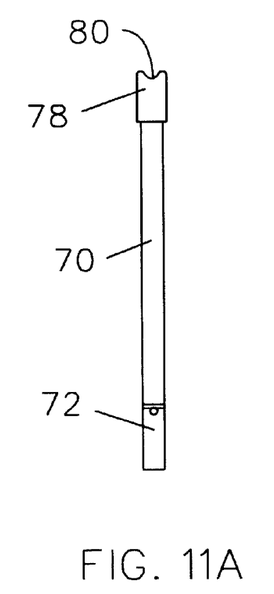
FIG. 11A is a side view of the upper sleeve of the first arm of the assembly of FIG. 1.
Figure 11B:
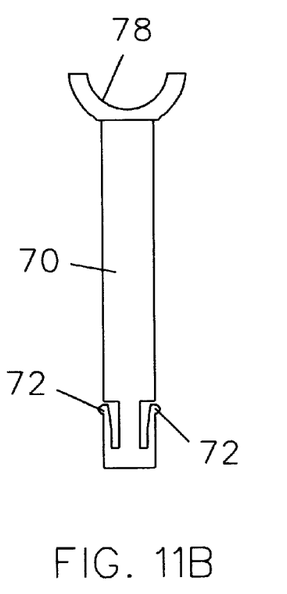
FIG. 11B is an end view of the upper sleeve of the first arm of the assembly of FIG. 1.
Figure 11C:
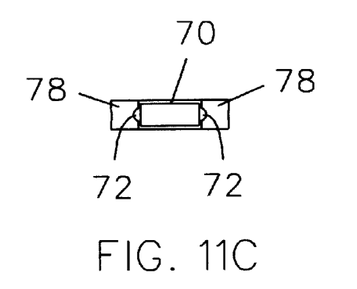
FIG. 11C is top view of the upper sleeve of FIG. 11A.
Figure 11D:
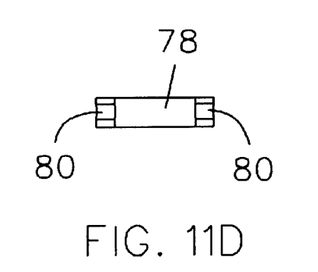
FIG. 11D is a bottom view of the upper sleeve of FIG. 11A.
Figure 12A:
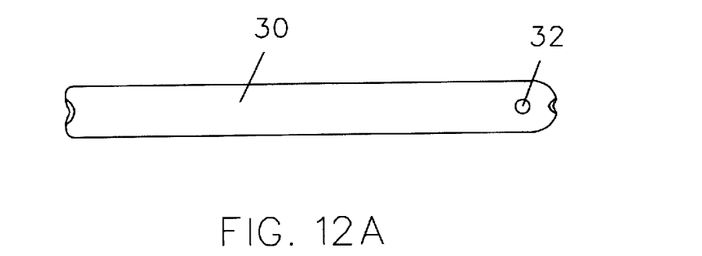
FIG. 12A is a top view of a leg of the assembly of FIG. 1.
Figure 12B:
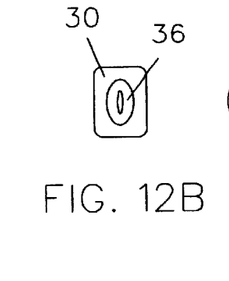
FIG. 12B is a side view of the free end of the leg of FIG. 12A.
Figure 12C:
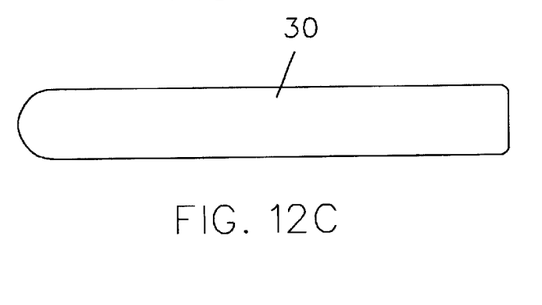
FIG. 12C is an end view of the leg of FIG. 12A.
Figure 12D:
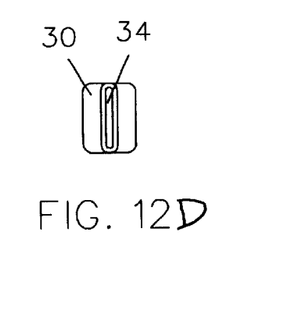
FIG. 12D is a side view of the opposed end of the leg of FIG. 12B.

The support assembly 10 further includes first 60 and second 60' arm assemblies. The first arm assembly 60 comprises a first lower sleeve 62 with a first upper sleeve 70 slidable therein. A pair of resilient flanges 72 are integrally attached to the sides of the first upper sleeve 70 (FIG. 11) and which releasably mate with a selected pair of apertures 68 along the first lower sleeve 62 (FIG. 7). The first lower sleeve 62 presents a plurality of spaced apart apertures 68 therethrough such that the height of the overall first arm assembly 60 can be regulated upon slidable placement of the first upper sleeve 70 therein. The first lower sleeve 62 is pivotally mounted to the base 20 within the channel 40 adjacent the first end 24 thereof and is selectively pivotal between a first transport position (FIGS. 5 and 6) and an upstanding support position (FIGS. 1–3). The first arm assembly 60 is pivotal about an axle 74 (FIG. 10B) which extends through the first lower sleeve 62 between the side walls 28. In the transport position, the first arm assembly 60 rests entirely within the base 20 while the first arm assembly 60 is normal to the base 20 when in its upstanding support position.

A first cradle 78 having a U-shaped configuration is fixedly attached to the free end of the first upper sleeve 70 (FIG. 1). The free ends of the first cradle 78 include notches 80 (FIG. 3) configured to mate with the first lower pair of nubs/flanges 48 within the cavity 42 when the first arm assembly 60 is in the first transport position (FIGS. 5 and 6).

A handle 82 is fixedly attached to the first lower sleeve 62 of the first arm assembly 60 and extends outwardly therefrom. Thus, a user can grasp the handle 82 to carry the support assembly 10 when the first arm assembly 60 is in the transport position.

The second arm assembly 60' is pivotally mounted to the base 20 adjacent the second end thereof and has a construction that is substantially similar to that of the first arm assembly 60 described above except as specifically noted below. Accordingly, primed numbers are used in the drawings to reference substantially similar structures. The second lower sleeve 62' is shorter than the first lower sleeve 62 such that a fishing rod supported thereon may be oriented at a desired angle of inclination.

Figure 9A:
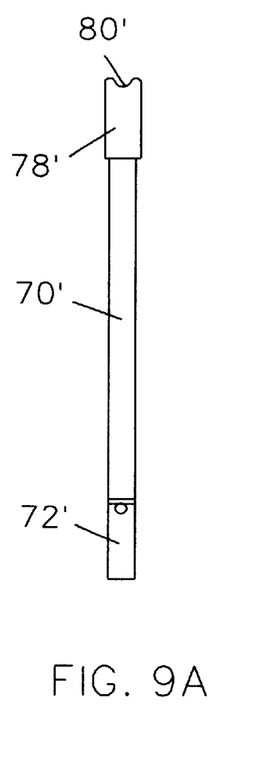
FIG. 9A is a side view of the upper sleeve of the second arm of the assembly of FIG. 1.
Figure 9B:
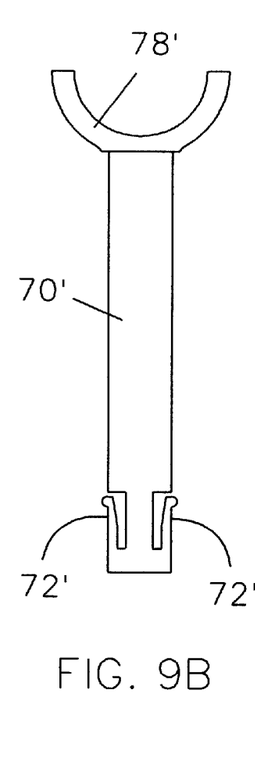
FIG. 9B is an end view of the upper sleeve of the second arm of the assembly of FIG. 1.
Figure 9C:
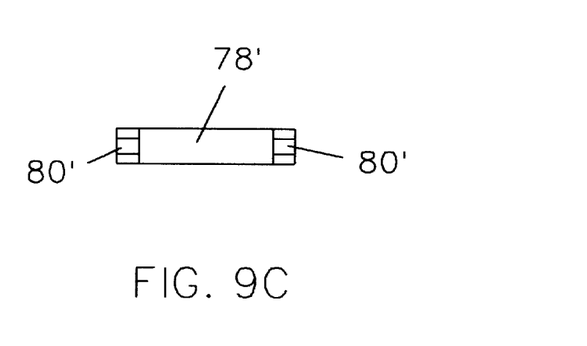
FIG. 9C is a top view of the upper sleeve of FIG. 9A.
Figure 9D:
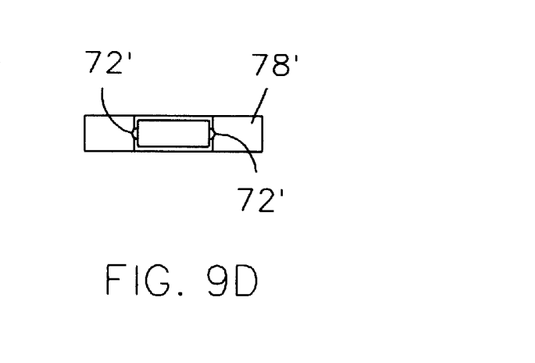
FIG. 9D is a bottom view of the upper sleeve of FIG. 9A.

In operation, the support assembly 10 is prepared for use by pivoting the support legs 30 and first 60 and second 60' arm assemblies to their extended or support positions normal to side wells 28. The nub/notch structures of these elements securely hold them in place during use. The upper sleeves 70, 70' of the first 60 and second 60' arm assemblies may be slidably extended to the desired height and securely positioned by registering the resilient flanges 72, 72' (FIGS. 9B, 11B) in selected apertures 68, 68'. The support assembly 10 is prepared for transport first by fully retracting the upper sleeves 70, 70' of the arm assemblies 60, 60'. Then, the second arm assembly 60' is pivoted to its transport position. Accordingly, the second arm assembly 60' rests within the deeper second recessed portion 46 of the channel 40 and the second cradle 78' rests at the bottom of the channel cavity 42 and engages the lower pair 48 of nubs/flanges therein. Next, the first arm assembly 60 is pivoted to rest within the more shallow first recessed portion 44 of the channel 40 and the first cradle 78 rests atop the second cradle 78' within the channel cavity 42 and engages the upper pair 50 of nubs/flanges therein. Thus, the arm assemblies 60, 60' are held securely and completely within the base 20 when in the transport position (FIG. 5). Finally, the legs 30 are pivoted to the transport position and releasably secured as previously described. The support assembly 10 may then be transported by grasping the handle 82 which extends from the lower sleeve 62 of the first arm assembly 60 and carrying the support assembly 10.

It is understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. A holder for a fishing rod comprising:
   a base having first and second ends adapted to extend along a ground surface;
   a channel in said base between said first and second base ends;
   a first arm pivotally mounted to said base first end between a first transport position within said channel and a second support position extending from said channel;
   a first cradle on said first arm adapted for supporting a portion of the fishing rod thereon upon said first arm being at said second extended position;
   a second arm pivotally mounted to said base second end between a first transport position within said channel and a second support position extending from said channel; and
   a second cradle on said second arm for supporting a portion of the fishing rod upon said second arm being at said second extended position.

2. The holder as claimed in claim 1 wherein said arms in said first transport position are within said base.

3. The holder as claimed in claim 1 wherein said arms at said second support position are generally normal to said base.

4. The holder as claimed in claim 1 wherein said first arm further comprises:
- a slidable arm within said first arm, said slidable arm having said first cradle thereon; and
- means for maintaining said slidable arm at a selectable position relative to said first arm, whereby to adjust the displacement of said cradle relative to said first arm.

5. The holder as claimed in claim 4 wherein said maintaining means comprises:
- a series of apertures in said first arm; and
- at least one resilient flange on said slidable arm adapted to register with one of said apertures for maintaining said slidable arm at a selected position relative to said first arm.

6. The holder as claimed in claim 1 wherein said second arm further comprises:
- a slidable arm within said second arm, said slidable arm having said first cradle thereon; and
- means for maintaining said slidable arm at a selectable position relative to said first arm, whereby to adjust the displacement of said cradle relative to said first arm.

7. The holder as claimed in claim 6 wherein said maintaining means comprises:
- a series of apertures in said second arm; and
- at least one resilient flange on said slidable arm adapted to register with one of said apertures for maintaining said slidable arm at a selected position relative to said second arm.

8. The holder as claimed in claim 1 further comprising means for maintaining said first and second arms at said first transport position in said base.

9. The holder as in claim 8 wherein said maintaining means comprises a pair of flanges on said base, said cradles having notches configured to selectively mate with said pair of flanges for selectively holding said cradles of said first and second arms in said first transport position.

10. The holder as claimed in claim 1 further comprising a handle extending from at least one of said arms adapted for grasping by a user upon said associated arm being in said transport position.

11. The holder as claimed in claim 1 further comprising:
- a first flange on said base adjacent said first base end, said first arm having a notch configured to releasably mate with said first flange for selectively holding said first arm at said second support position; and
- a second flange on said base adjacent said second base end, said second arm having a notch configured to releasably mate with said second flange for selectively holding said second arm at said second support position.

12. The holder as claimed in claim 1 wherein said cradles are positioned one atop the other within said channel in said first transport position.

13. The holder as claimed in claim 1 further comprising a recess in said base for extension of said first and second cradles therein when said arms are in said first transport position.

14. The holder as in claim 13 wherein said channel comprises a first bottom well extending between said first base end and said recess and a second bottom well offset from said first bottom well and extending between said second base end and said recess, said first bottom well below said second bottom well whereby to respectively support said first and second arms in an offset relationship and position, said first and second positioned cradles one atop the other within said channel recess when in said first transport position.

15. The holder as in claim 1 further comprising:
- at least one leg extending from said base adapted for positioning atop a support surface; and
- means for pivoting said at least one leg between a first position within said base and a second position extending from said base for contact with the support surface.

16. A holder for a fishing rod, comprising:
- a base having first and second ends adapted to extend along a ground support surface;
- a channel in said base between first and second base ends;
- a first arm assembly pivotally mounted to said base first end between a first transport position within said channel and a second support position vertically extending from said channel;
- means on said first arm assembly adapted for supporting a portion of the fishing rod thereon upon said first arm assembly being at said second extended position;
- a second arm assembly pivotally mounted to said base second end between a first transport position within said channel and a second support position vertically extending from said channel;
- means on said second arm assembly for supporting a portion of the fishing rod upon said second arm assembly being at said second extended position; and
- a leg assembly pivotally mounted to said base between a first position within said base and a second position extending from said base.

17. The holder as claimed in claim 16 wherein said first arm assembly further comprises:
- a lower sleeve pivotally mounted to said base;
- an upper sleeve slidable within said lower sleeve, said upper sleeve having said support means thereon; and
- means for maintaining said upper sleeve at a selectable position relative to said lower sleeve, whereby to adjust the displacement of said support means relative to said lower sleeve.

18. The holder as claimed in claim 16 wherein said second arm assembly comprises:
- a lower sleeve pivotally mounted to said base;
- an upper sleeve slidable within said upper sleeve, said upper sleeve of said second arm assembly having said support means of said second arm assembly thereon; and
- means for maintaining said upper sleeve at a selectable position relative to said lower sleeve, whereby to adjust the displacement of said second arm assembly support means relative to said lower sleeve.

19. The holder as claimed in claim 16 further comprising means on said base for maintaining said first or second arm assemblies or both in said first transport position.

20. A holder for a fishing rod, comprising:
- a base having a bottom support wall, spaced apart side walls, and spaced apart first and second end walls, said bottom wall adapted to extend along a ground support surface;
- a channel in said base between said side walls and between said first and second end walls;

a first arm pivotally mounted adjacent said base first end wall between a first transport position within said channel and a second support position extending from said channel;

means on said first arm adapted for supporting a portion of the fishing rod at a selectable position relative to said first arm upon said first arm being at said second support position;

a second arm pivotally mounted adjacent said base second end wall between a first transport position within said channel and a second support position extending from said channel;

means on said second arm adapted for supporting a portion of the fishing rod at a selectable position relative to said second arm upon said second arm being at said second support position; and means in said channel and on at least one of said first or second arms for releasable engagement therebetween upon said arms being at said transport positions, whereby to lock said at least one of said arms in said base.

* * * * *